US009957932B2

(12) United States Patent
Metz et al.

(10) Patent No.: US 9,957,932 B2
(45) Date of Patent: May 1, 2018

(54) FILTER ASSEMBLY FOR SEPARATING WATER FROM FUEL (71) Applicant: Illinois Tool Works Inc., Glenview, IL (US)

(72) Inventors: Brendan G Metz, Crystal Lake, IL (US); Gina L Powers, Lake Geneva, WI (US); Jonathan P LeBlanc, Lake in the Hills, IL (US); Christopher J Cichelli, Grayslake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 143 days.

(21) Appl. No.: 14/680,804

(22) Filed: Apr. 7, 2015

(65) Prior Publication Data
US 2015/0292455 A1    Oct. 15, 2015

Related U.S. Application Data (60) Provisional application No. 61/978,654, filed on Apr. 11, 2014.

(51) Int. Cl.
*F02M 37/22*    (2006.01)
*B01D 35/00*    (2006.01)
*B01D 36/00*    (2006.01)
*B01D 35/157*   (2006.01)

(52) U.S. Cl.
CPC ......... *F02M 37/221* (2013.01); *B01D 35/005* (2013.01); *B01D 36/003* (2013.01); *B01D 35/157* (2013.01); *B01D 35/1573* (2013.01)

(58) Field of Classification Search
CPC ... F02M 37/221; B01D 35/005; B01D 36/003
USPC ................................. 210/123, 416.4
See application file for complete search history.

(56) References Cited

U.S. PATENT DOCUMENTS

| 1,519,479 | A | * | 12/1924 | Bennefeld | ............ | B01D 35/005 |
| | | | | | | 137/544 |
| 3,187,895 | A | * | 6/1965 | Pall | .................... | B01D 17/0214 |
| | | | | | | 210/114 |
| 3,385,440 | A | * | 5/1968 | Ray | .................... | B01D 17/0214 |
| | | | | | | 210/109 |

(Continued)

*Primary Examiner* — Sizo Vilakazi
*Assistant Examiner* — Kevin R Steckbauer
(74) *Attorney, Agent, or Firm* — Joseph M. Butscher; The Small Patent Law Group, LLC (57) ABSTRACT

A filter assembly is configured to prevent water from infiltrating a fuel tank and/or engine. The filter assembly may include a housing having a fuel inlet line and a fuel outlet line. The housing defines an internal chamber in fluid communication with the fuel inlet line and the fuel outlet line. Fuel passes into the internal chamber through the fuel inlet, and filtered fuel passes out of the internal chamber to the fuel tank and/or the engine through the fuel outlet line. A filtering frame may be secured within the internal chamber, and may include a coalescing frame portion that is configured to allow water to coalesce thereon and sink toward a bottom of the internal chamber, and a hydrophobic frame portion that is configured to repel the water from a valve coupled to the fuel outlet line. A flow restrictor is configured to float on the water toward the valve. The flow restrictor sealingly engages the valve to prevent fluid from flowing through the valve when a surface level of the water is proximate to the valve.

20 Claims, 8 Drawing Sheets (56) References Cited

U.S. PATENT DOCUMENTS

| | | | | |
|---|---|---|---|---|
| 3,485,370 A * | 12/1969 | Mori | ............... | F23K 5/02 |
| | | | | 210/124 |
| 4,053,405 A * | 10/1977 | DeKeyser | ............ | B01D 35/143 |
| | | | | 137/172 |
| 4,364,825 A * | 12/1982 | Connor, Jr. | .......... | B01D 27/106 |
| | | | | 210/109 |
| 4,384,962 A * | 5/1983 | Harris | ................ | B01D 17/0208 |
| | | | | 210/259 |
| 4,420,392 A * | 12/1983 | Harris | ............... | B01D 17/0208 |
| | | | | 210/114 |
| 4,477,345 A * | 10/1984 | Szlaga, Jr. | ......... | B01D 17/0214 |
| | | | | 210/130 |
| 4,497,714 A * | 2/1985 | Harris | ................ | B01D 17/0208 |
| | | | | 210/114 |
| 5,575,311 A * | 11/1996 | Kingsford | ............. | F16K 11/022 |
| | | | | 137/625.5 |
| 9,121,376 B2 * | 9/2015 | Veit | ..................... | F02M 37/221 |
| 9,353,713 B2 * | 5/2016 | Terry | ................... | F02M 37/221 |
| 2009/0139915 A1 * | 6/2009 | Tondreau | ............ | B01D 29/114 |
| | | | | 210/86 |
| 2013/0153487 A1 * | 6/2013 | Terry | ................... | F02M 37/221 |
| | | | | 210/342 |
| 2016/0222931 A1 * | 8/2016 | Jiang | ................... | B01D 35/153 |
| 2017/0050134 A1 * | 2/2017 | Veit | ..................... | B01D 36/003 |

* cited by examiner

FILTER ASSEMBLY FOR SEPARATING WATER FROM FUEL

RELATED APPLICATIONS

This application relates to and claims priority benefits from U.S. Provisional Patent Application No. 61/978,654 entitled "Water Separation Filter," filed Apr. 11, 2014, which is hereby incorporated by reference in its entirety.

FIELD OF EMBODIMENTS OF THE DISCLOSURE

Embodiments of the present disclosure generally relate to filter assemblies, and, more particularly, to filter assemblies configured to remove contaminants from fuels.

BACKGROUND

Fuel contamination is a recurring problem associated with the use and operation of various internal combustion engines, such as those of various types of equipment (for example, lawnmowers, trimmers, edgers, vacuums, blowers, snow blowers, snowmobiles, all-terrain vehicles, boats, and the like). Fuel for such engines is often stored for relatively long periods in fuel storage containers that are kept outdoors or within garages.

Often, a fuel tank of a piece of equipment is dirty. For example, the fuel tank may be periodically exposed to the elements and may be covered with debris such as dirt, dust, grass clippings, etc. Even when cleaned and opened carefully, debris proximate to the inlet opening or the surrounding areas may enter the fuel tank. Particulate contamination of the fuel is not uncommon, and may occur both in the fuel tank of the equipment, and in the fuel storage container.

Additionally, current fuels may also be a source of contamination. For example, certain types of gasoline include alcohol. The alcohol may separate from water during temperature changes. Because alcohol is able to absorb and retain water, fuels may include significant amounts of water. The alcohol in the fuel absorbs and retains water, and may release the water during changes in ambient temperature. As such, water may accumulate and remain in its natural state, subsequently fouling the fuel and possibly damaging an engine during use. Because equipment itself may be used infrequently, fuel may remain in a fuel tank for extended periods of time. Therefore, fouling of fuel may occur in a fuel storage tank as well as a fuel tank of equipment.

Accordingly, a need exists for systems and methods of filtering contaminants from fuel. Further, a need exists for efficient systems and methods of filtering water from fuel that is configured to be used with an internal combustion engine.

SUMMARY OF EMBODIMENTS OF THE DISCLOSURE

Certain embodiments of the present disclosure provide a filter assembly that is configured to prevent water from infiltrating one or both of a fuel tank or engine. The filter assembly may include a housing including a fuel inlet line and a fuel outlet line. The housing defines an internal chamber in fluid communication with the fuel inlet line and the fuel outlet line. The housing is configured to allow fuel to pass into the internal chamber through the fuel inlet, and to allow filtered fuel to pass out of the internal chamber to the fuel tank or the engine through the fuel outlet line. A filtering frame may be secured within the internal chamber. The filtering frame may include a coalescing frame portion that is configured to allow water to coalesce thereon and sink toward a bottom of the internal chamber, and a hydrophobic frame portion that is configured to repel the water from a valve coupled to the fuel outlet line. A flow restrictor is configured to float on the water toward the valve. The flow restrictor sealingly engages the valve to prevent fluid from flowing through the valve when a surface level of the water is proximate to the valve.

In at least one embodiment, the housing may include a base connected to a cap. The base may include a support floor. The cap may include the fuel inlet line and the fuel outlet line.

In at least one embodiment, the coalescing frame portion may include a first rim connected to a second rim through a plurality of extension beams. The plurality of extension beams may be regularly spaced about the coalescing frame portion.

The hydrophobic frame portion may include a plurality of inwardly-canted beams that connect to the valve. The valve may include a central hub having a passage formed therethrough. The plurality of inwardly-canted beams may be regularly spaced about the hydrophobic frame portion. The hydrophobic frame portion may include a conic shape.

The flow restrictor may include a ball. The specific gravity of the flow restrictor is greater than the specific gravity of the fuel and less than the specific gravity of water. As such, the flow restrictor is able to float on the water, but sink when submerged in the fuel.

Certain embodiments of the present disclosure provide an equipment system. The equipment system may include a fuel delivery line, an engine disposed at an end of the fuel delivery line, and a filter assembly disposed within the fuel delivery line upstream from the engine. The filter assembly is configured to prevent water from infiltrating the engine.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a filter assembly that is configured to prevent water from infiltrating (for example, reaching or otherwise entering) a fuel tank of equipment, such as a vehicle, automated tool, or the like. Embodiments of the present disclosure provide systems and methods for deactivating an engine in response to water within a filter assembly reaching a particular threshold level or maximum capacity, for example.

Embodiments of the present disclosure provide a filter assembly that may be an in-line water separating fuel assembly. The filter assembly may include a coalescing filter portion, which may be formed from one or more coalescing media, and a hydrophobic filter portion, which may be formed from one or more hydrophobic media. Fuel may flow into an input line of the filter assembly and out through an output line. As water in the fuel passes into the filter assembly, the water contacts the coalescing filter portion. Water is unable to pass through the hydrophobic filter portion. Because water is heavier than the fuel (such as gasoline), the water may collect at a bottom portion of the filter assembly. As water continues to collect, the level of an upper surface of the water moves up the hydrophobic filter portion, thereby filling a cone chamber, which causes a ball to rise and eventually shut off a valve outlet once the cone chamber is filled.

The filter assembly may include a frame, which may be integrally formed and molded as a single piece. Alternatively, the frame may include separate and distinct portions that are fastened together. The coalescing and hydrophobic filter portions may be molded and formed to fit into or otherwise on the frame.

A fuel/water separator is described in PCT/US2014/020923, filed on Mar. 5, 2014, which is hereby incorporated by reference in its entirety.

Figure 1:
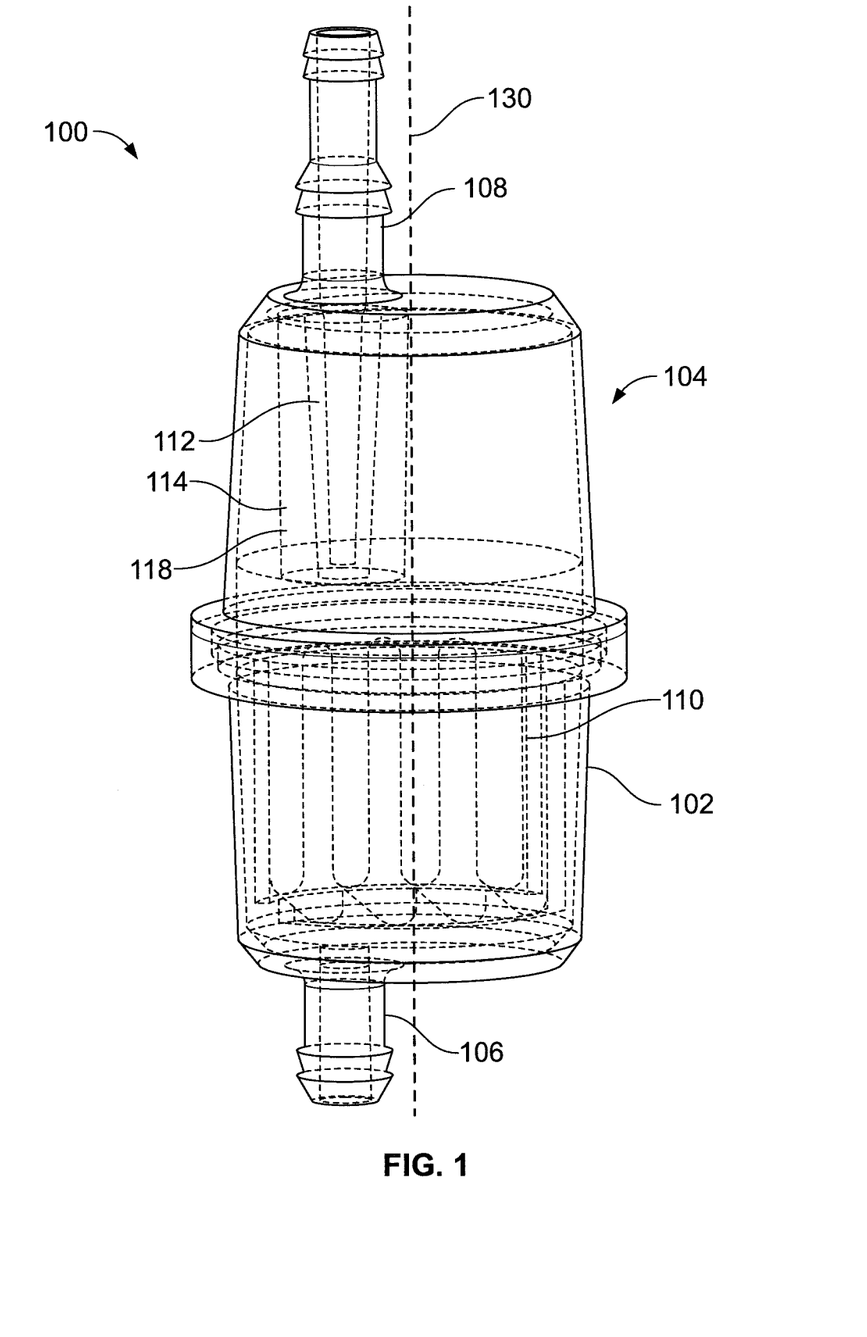
FIG. 1 illustrates a perspective partial internal view of a filter assembly, according to an embodiment of the present disclosure.

FIG. 1 illustrates a perspective partial internal view of a filter assembly 100, according to an embodiment of the present disclosure. The filter assembly 100 may include a first housing compartment or portion 102 coupled to a second housing compartment or portion 104. The first and second housing portions 102 and 104 cooperate to form a single housing. The first housing portion 102 may include an inlet fuel line coupling 106 that is in fluid communication with an interior of the first housing portion 102. The second housing portion 104 includes an outlet fuel line coupling 108 that is in fluid communication with an interior of the second housing portion 104.

The filter assembly 100 may be installed in a fuel line of an internal combustion engine such that contaminated fuel from an equipment fuel tank enters the filter assembly 100 at the inlet fuel line coupling 106. Contaminants within the fuel are removed and retained in the first and second housing portions 102 and 104, and clean, filtered fuel passes out of the filter assembly 100 through the outlet fuel line coupling 108.

The first housing portion 102 may include or otherwise retain a particulate filter 110 that is configured to remove particulate contaminants. The second housing portion 104 may include or otherwise retain a hydrophobic filter 112 that is configured to separate water from fuel. Each of the first and second housing portions 102 and 104 may be formed from injection-molded plastics. Alternatively, the first and second housing portions 102 and 104 may be formed of various other types of plastics or metals. The particulate filter 110 and the hydrophobic filter 112 are positioned within the first and second housing portions 102 and 104, respectively, and the first and second housing portions 102 and 104 are connected together such as through sonic welding to provide a leak-proof seal therebetween.

Figure 2:
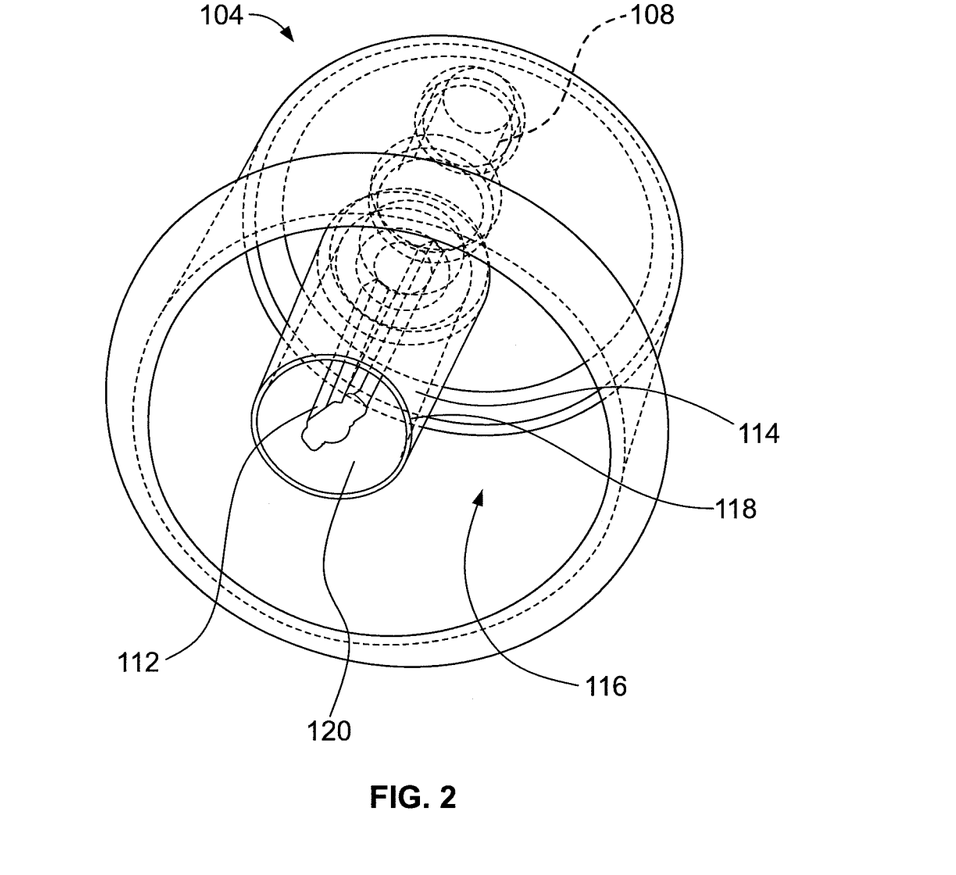
FIG. 2 illustrates a perspective bottom internal view of a second housing portion of a filter assembly, according to an embodiment of the present disclosure.

FIG. 2 illustrates a perspective bottom internal view of the second housing portion 104 of the filter assembly 100 (shown in FIG. 1), according to an embodiment of the present disclosure. Referring to FIGS. 1 and 2, the hydrophobic filter 112 may be encased in plastic. An outer casing 114 may extend downwardly from the outlet fuel line coupling 108 within an internal chamber 116 of the second housing portion 104. The outer casing 114 may be contained within the internal chamber 116, and may include a sleeve 118 that defines an internal passage 120. The hydrophobic filter 112 may be secured within the internal passage 120 of the sleeve 118. The outer casing 114 is configured to limit pressure on the hydrophobic filter 112 that may be caused by engine vibration. By limiting or otherwise reducing the amount of pressure exerted into or otherwise on the hydrophobic filter 112, the hydrophobic filter 112 is able to more efficiently separate water from fuel.

In operation, the filter assembly 100 allows water to settle at the bottom of the filter assembly 100, such as within the first housing 102. Water has a higher density than fuel, such as gasoline, and is therefore able to settle within the bottom of the filter assembly 100. At the same time, fuel flows through the filter assembly 100. The hydrophobic filter 112 repels water, thereby preventing water from passing into the outlet fuel line coupling 108. The outer casing 114 reduces pressure exerted into or on the hydrophobic filter 112, thereby reducing the chance of water passing into and/or through the hydrophobic filter 112. The outer casing 114 may also be formed of a plastic, metal, or the like, and may include one or more hydrophobic materials.

The outer casing 114 may be a shroud that provides a barrier that protects against pressure caused by engine vibrations, thereby increasing the ability of the hydrophobic filter 112 to resist water infiltration. As one example, the outer casing 114 reduces vibrational contact of a fluid, such as a splashing liquid, on the hydrophobic filter 112. The hydrophobic filter 112 ensures that water does not pass through the outlet fuel line coupling 108, which connects to an engine, for example.

The outer casing 114 may be flared, repositioned, or the like, to enhance a limited amount of water passing in to the space between the outer casing 114 and the hydrophobic filter 112. In at least one embodiment, the outer casing 114 may be formed of the same material as the second housing portion 104. For example, the outer casing 114 may be integrally formed and molded along with the second housing portion 104.

In at least one embodiment, the inlet fuel line coupling 106 and the outlet fuel line coupling 108 may be offset from a longitudinal central axis 130 of the filter assembly 100. Each of the first and second housing portions 102 and 104 may be clear and transparent to allow for observation of filters. As such, an individual may view the filters 110 and 112 to determine if each is to be serviced or replaced.

Notably, as water accumulates within the filter assembly 100, the water may reach the hydrophobic filter 112. Indeed, the water may rise to levels up to and past the hydrophobic filter 112, at which point the hydrophobic filter may be unable to prevent water from passing into the outlet fuel line coupling 108. As such, embodiments of the present disclosure provide systems and methods for preventing water from infiltrating into the outlet fuel line coupling 108.

Figure 3:
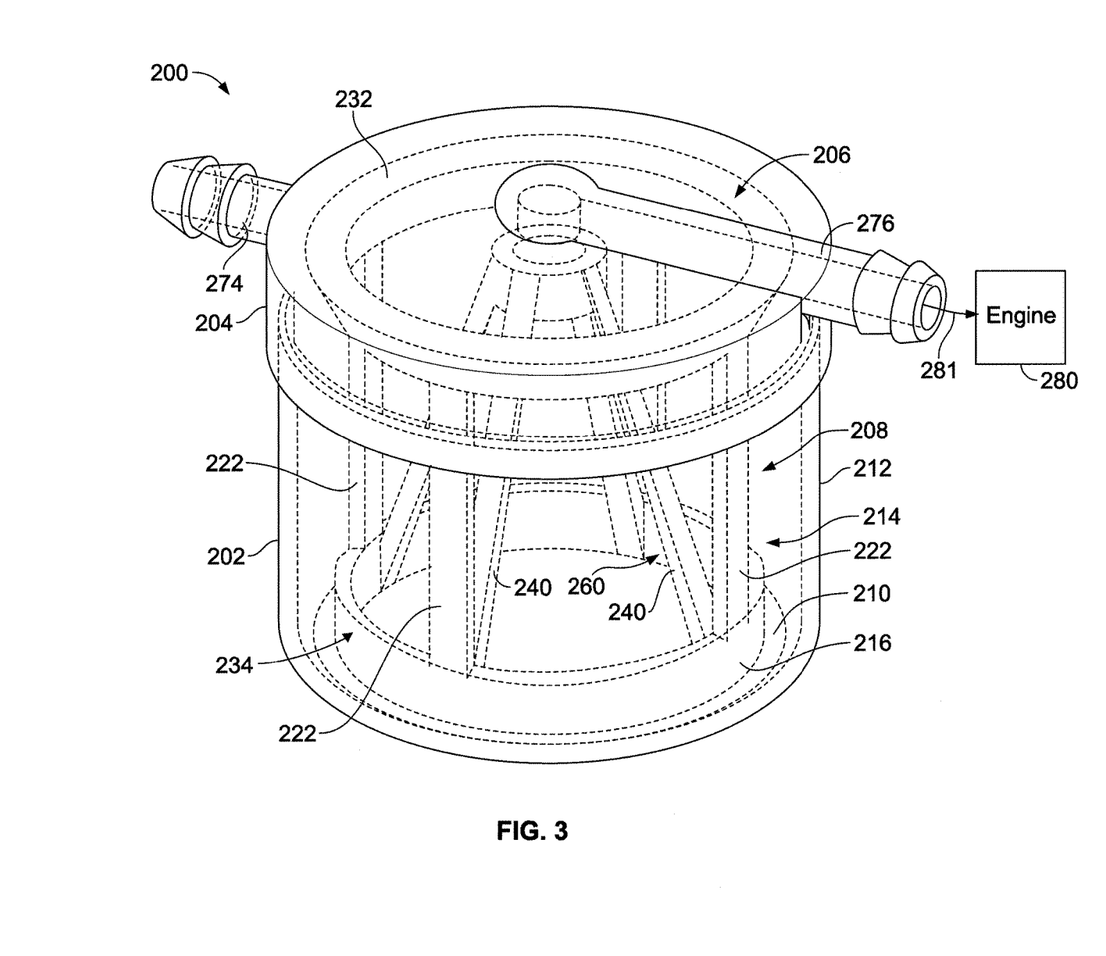
FIG. 3 illustrates a perspective top partial internal view of a filter assembly, according to an embodiment of the present disclosure.

FIG. 3 illustrates a perspective top partial internal view of a filter assembly 200, according to an embodiment of the present disclosure. The filter assembly 200 is configured to be used with an equipment system having an engine and a fuel tank. The filter assembly 200 may be disposed within a fuel delivery path between the engine and the fuel tank. Optionally, the filter assembly 200 may be disposed within the fuel delivery path upstream from both the fuel tank and the engine. The equipment system may be or include a vehicle, automated tools or components (such as a lawnmower, edger, snowblower, etc.), and the like.

The filter assembly 200 may include a base 202 connected to a cap 204. The base 202 and the cap 204 cooperate to provide a housing. The base 202 and the cap 204 may be separate and distinct components that are connected together. Alternatively, the base 202 and the cap 204 may be integrally formed and molded as a single, leak-proof enclosure. An internal filtering frame 206 is retained within an internal chamber 208 defined by the base 202 and the cap 204.

Figure 4:
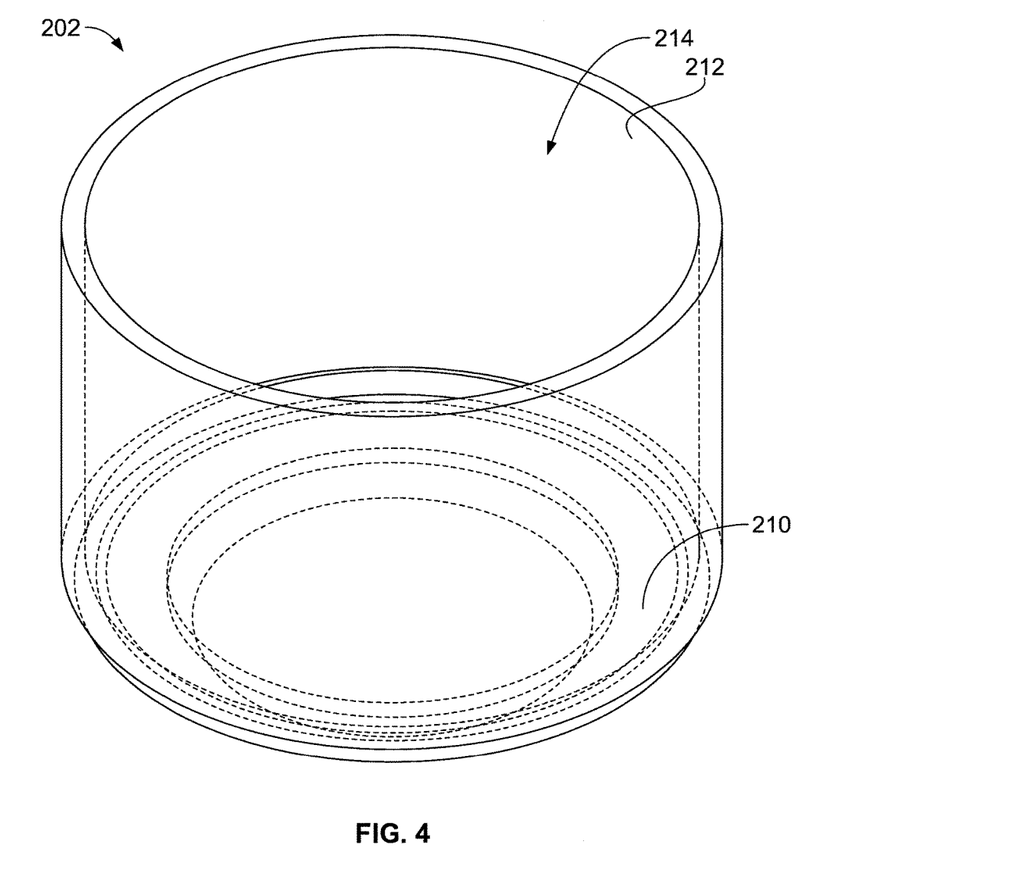
FIG. 4 illustrates a perspective top view of a base of a filter assembly, according to an embodiment of the present disclosure.

FIG. 4 illustrates a perspective top view of the base 202 of the filter assembly 200 (shown in FIG. 3), according to an embodiment of the present disclosure. Referring to FIGS. 3 and 4, the base 202 includes a frame support floor 210 connected to an upstanding cylindrical wall 212. The support floor 210 and the wall 212 define a filtering chamber 214 that is configured to receive and retain the filtering frame 206. The filtering chamber 214 may form at least a portion of the internal chamber 208.

As shown, the base 202 may be generally cylindrical. Alternatively, the base 202 and the filter assembly 200 in general may be various other shapes and sizes, such as block shaped, elliptical shaped, or the like.

Figure 5:
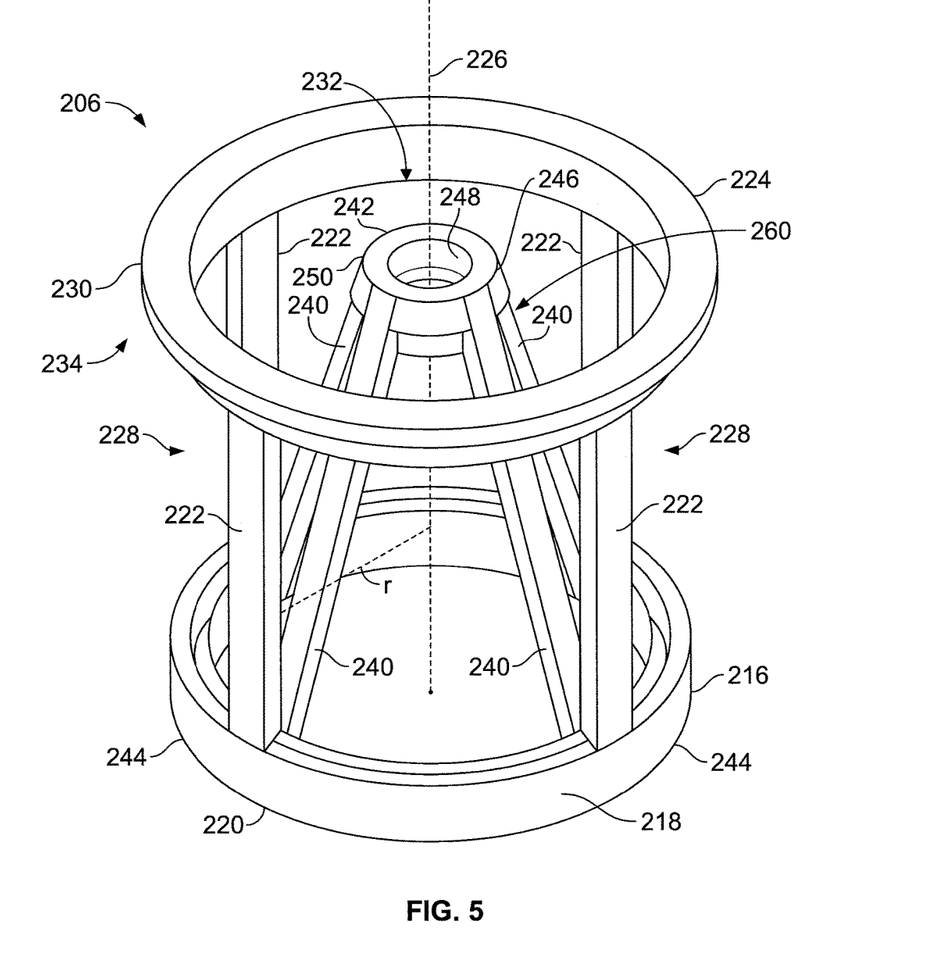
FIG. 5 illustrates a perspective top view of a filtering frame, according to an embodiment of the present disclosure.

FIG. 5 illustrates a perspective top view of the filtering frame 206, according to an embodiment of the present disclosure. Referring to FIGS. 3-5, the filtering frame 206 may include a first rim 216, such as a lower rim, that is configured to be supported by the support floor 210 of the base 202. The first rim 216 may include an annular wall 218 that defines a central opening 220.

Extension beams 222 extend upwardly from the first rim 216 and connect to a second rim 224, which opposes the first rim 216. The extension beams 222 space the first rim 216 apart from the second rim 224. As shown, the extension beams 222 may extend between the first and second rims 216 and 224 such that they are aligned with a central longitudinal axis 226 of the filtering frame 206. For example, a radius r from the central longitudinal axis 226 of each of the extension beams 222 may be constant along an entire height of each extension beam 222.

The extension beams 222 may be regularly spaced apart from one another about a circumference of the first and second rims 216 and 224. As shown, the filtering frame 206 may include four-regularly spaced extension beams 222, with the center of each being spaced from a neighboring (that is, closest without intervening beams therebetween) extension beam 222 by 90 radial degrees. As such, spaces 228 are formed between neighboring extension beams 222. The spaces 228 allow fluid, such as liquid fuel or water, to flow therethrough. Alternatively, more or less extension beams 222 than shown may be used. Also alternatively, instead of spaced-apart extension beams, the filtering frame 206 may include an open-ended cylinder having a plurality of holes formed therethrough.

The second rim 224, such as an upper rim, may be configured to abut into an internal surface of the cap 204. The second rim 224 may include an annular wall 230 that defines a central opening 232.

The first rim 216, the second rim 224, and the extension beams 222 may be formed of a coalescing material, medium, or media, that is configured to allow water droplets to collect thereon and coalesce together to form larger droplets. For example, water may cling to the first rim 216, the second rim 224, and the extension beam 222, which may collectively provide a coalescing outer frame or frame portion 234 formed of plastic, metal, or the like. As the water clings to the coalescing outer frame, the water, by force of gravity, may sink or otherwise descend downwardly thereon, and coalesce with other water droplets.

The filtering frame 206 may also include inwardly-canted beams 240 that extend from internal surfaces of the first rim 216 toward a valve, which may include a central hub 242 that is centered about the central longitudinal axis 226. Each inwardly-canted beam 240 may extend from an internal surface of the first rim 216 proximate to a root 244 of an extension beam 222. As such, the inwardly-canted beams 240 may be regularly spaced about the first rim 216. Alternatively, more or less inwardly-canted beams 240 may be used. Further, the inwardly-canted beams 240 may be at different positions than shown.

The central hub 242 may include a collar 246 that defines a valve passage 248. A top surface of the central hub 242 may be at the same height as a top surface of the second frame 224. Optionally, the central hub 242 may be below the second frame 224. A top surface 250 of the central hub 242 is configured to abut into an interior surface of the cap 204 abut a fuel outlet. The central hub 242 may abut into the cap 204 so that the passage 248 aligns with and connects to an internal passage of an outlet fuel line. As such, the central hub 242 provides a conduit into the fuel outlet of the cap 204.

The inwardly-canted beams 240 and the central hub 242 may be formed of one or more hydrophobic materials, and may be covered with plastic, for example. As such, the inwardly-canted beams 240 and the central hub 242 may combine to form a conic hydrophobic inner frame or frame portion 260 that is configured to repel water.

The inwardly canted beams 240 and the central hub 242 provide the hydrophobic inner frame 260 with a conic shape. The conic shape of the hydrophobic inner frame 260 is configured to direct a flow restrictor, such as a ball, towards and into the passage 248 of the central hub 242 as a level of water rises within the internal chamber 208 of the filter assembly 200. Alternatively, the hydrophobic inner frame 260 may include a cone having a plurality of fluid passages formed therethrough.

Figure 6:
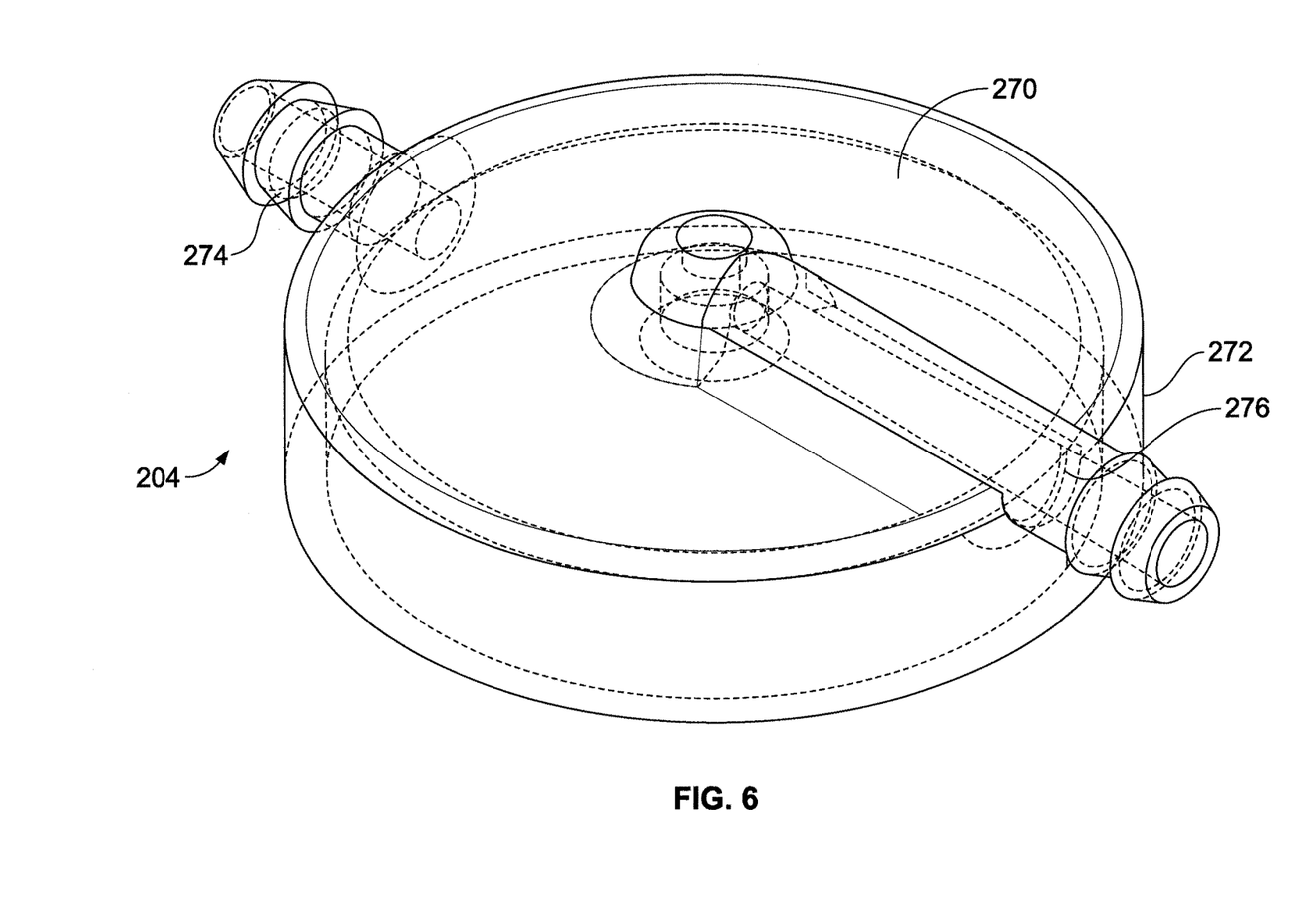
FIG. 6 illustrates a perspective top view of a cap of a filter assembly, according to an embodiment of the present disclosure.

FIG. 6 illustrates a perspective top view of the cap 204 of the filter assembly 200 (shown in FIG. 3), according to an embodiment of the present disclosure. Referring to FIGS. 3 and 6, the cap 204 includes a top cover 270 connected to a downwardly-extending circumferential wall 272. An inlet fuel line 274 extends from a portion of the wall 272, while an outlet fuel line 276 connects to the top cover 270. The inlet fuel line 274 is configured to allow fuel to pass therethrough into the filter assembly 200, while the outlet fuel line 274 is configured to allow filtered fuel to pass therethrough and into an engine 280. For example, the filter assembly 200 may be disposed within a fuel delivery line 281 upstream from the engine 280. Optionally, the filter assembly 200 may be located upstream from a fuel storage tank that is coupled to the engine. As such, the filter assembly 200 may be configured to prevent water from infiltrating into a fuel storage tank.

Referring to FIG. 3, the filtering frame 206 is secured within the base 202. The cap 204 is then secured over the base 202 to securely contain the filtering frame 206 therebetween. The cap 204 may be secured to the base 202 in a fluid tight manner, such as through sonic welding. Additionally, one or more sealing members, such as gaskets, O-rings, elastomeric rings, and/or the like may be disposed between the base 202 and the cap 204.

Figure 7:
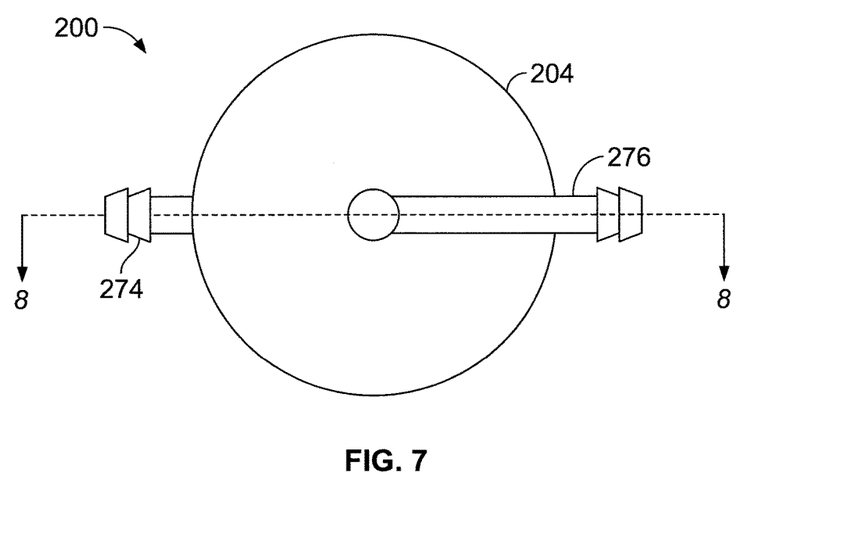
FIG. 7 illustrates a top plan view of a filter assembly, according to an embodiment of the present disclosure.

FIG. 7 illustrates a top plan view of the filter assembly 200, according to an embodiment of the present disclosure. As shown, the inlet fuel line 274 may be aligned with the outlet fuel line 276 with respect to a common plane. Alternatively, the inlet fuel line 274 may be angled with respect to the outlet fuel line 276.

Figure 8:
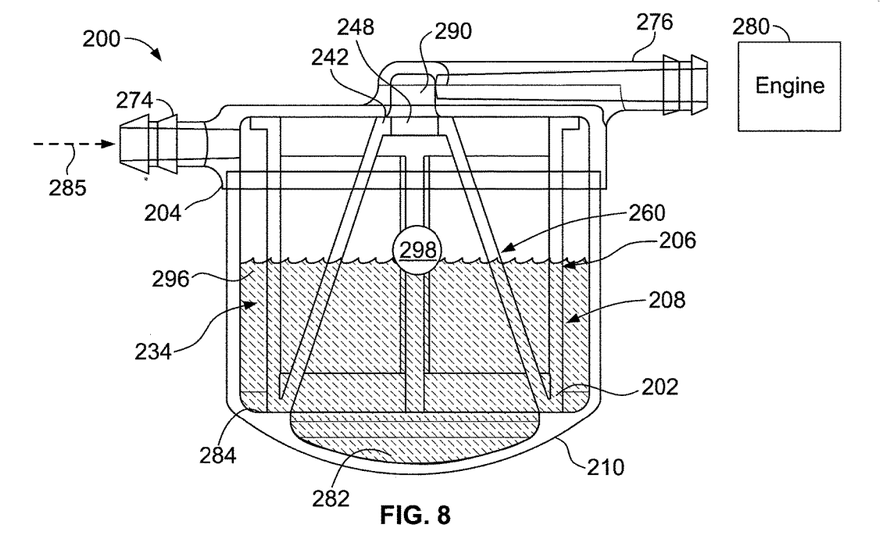
FIG. 8 illustrates a cross-sectional view of a filter assembly through line 8-8 of FIG. 7, according to an embodiment of the present disclosure.

FIG. 8 illustrates a cross-sectional view of the filter assembly 200 through line 8-8 of FIG. 7, according to an embodiment of the present disclosure. As shown, the support floor 210 of the base 202 may include a depressed basin 282 that downwardly recedes from an outer ledge 284. The filtering frame 206 may be supported on the outer ledge 284.

In operation, fuel 285 passes into the filter assembly 200 through the inlet fuel line 274. As the fuel 285 passes into the internal chamber 208, water within the fuel coalesces on the coalescing outer frame 234 and sinks toward and collects in the central basis 282. The hydrophobic inner frame 260 repels the water, thereby keeping the water away from the central hub 242 and a fluid passage 290 formed through the outlet fuel line 276 that aligns with the passage 248 of the central hub 242. However, as water continues to accumulate within the internal chamber 208, the surface 296 of the water rises toward the central hub 242. A flow restrictor 298, such as a ball, floats on the water (but sinks through the fuel) and rises along with the surface level 296 of the water. The flow restrictor 298 is heavier than the fuel, so as not to float on the fuel. As the surface level 296 of the water reaches the central hub 242, the flow restrictor 298 lodges into the passage 248 of the central hub 242, forming a fluid-tight seal with an internal wall portion of the central hub 242. As such, fluid is prevented from passing into the outlet fuel line 276. In this manner, water is prevented from passing into the engine 280. Instead, when the flow restrictor 298 is lodged in the central hub 242, the flow restrictor 298 prevents fluid from passing therethrough. Accordingly, the engine 280 may automatically deactivate due to lack of fuel. However, the engine 280 is protected from damage that could otherwise be caused by water infiltration.

The fuel 285 may include water as it enters the filter assembly 200. The water may be in the form of water droplets. The water droplets coalesce into larger water droplets on the coalescing outer frame 234, and then sink toward the support floor 210, such as through force of gravity. Water has a specific gravity of 1, thereby allowing it to sink to the support floor 210. The hydrophobic inner frame 260 repels the water from the outlet fuel line 276. However, the fuel may be gasoline, which has a specific gravity of 0.72, which therefore separates from the sinking water and flows into the outlet fuel line 276. Once the interior chamber 208 completely fills with water, the flow restrictor 298 is forced into a sealing engagement with the central hub 242, thereby preventing fluid from flowing into the outlet fuel line 276.

The flow restrictor 298 may be formed of a material having a specific gravity that exceeds that of the gasoline, but is less than that of water. For example, the flow restrictor 298 may have a specific gravity that is greater than 0.72, but less than 1.

Figure 9:
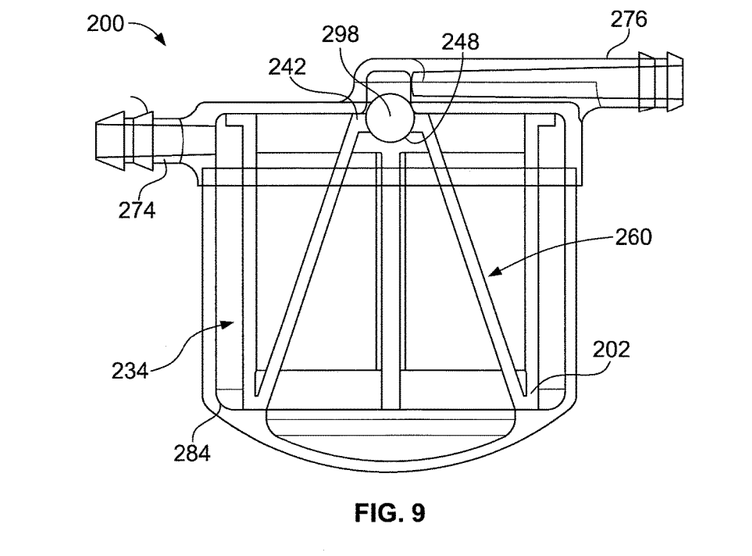
FIG. 9 illustrates a cross-sectional view of a filter assembly through line 8-8 of FIG. 7 having a flow restrictor preventing fluid flow into an outlet fuel line, according to an embodiment of the present disclosure.

FIG. 9 illustrates a cross-sectional view of the filter assembly 100 through line 8-8 of FIG. 7 having the flow restrictor 298 preventing fluid flow into the outlet fuel line 276, according to an embodiment of the present disclosure. As shown, the flow restrictor 298 is lodged within the passage 248 of the central hub 242, thereby preventing fluid from flowing into the outlet fuel line 276.

The flow restrictor 298 may be various other shapes and sizes. The flow restrictor 298 may be sized and shaped to conform to a portion of an interior shape of the central hub 242.

The embodiments shown and described with respect to FIGS. 3-9 may be used with the embodiments shown and described with respect to FIGS. 1 and 2. For example, the filter assembly 100 may include a stop sleeve having fluid passages formed therethrough. The stop sleeve may slidably retain a flow restrictor, which may rise toward an opening connected to an outlet fuel line as it floats on accumulating water.

Referring to FIGS. 1-9, embodiments of the present disclosure provide filter assemblies that are configured to filter contaminants from fuel. Embodiments of the present disclosure provide filter assemblies that prevent water from passing into an outlet fuel line that is in fluid communication with an engine and/or a fuel tank. The filter assemblies prevent water from infiltrating into an engine, gas tank, or the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35

U.S.C. § 112(f), unless and until such claim limitations expressly use the phrase "means for" followed by a statement of function void of further structure.

Various features of the disclosure are set forth in the following claims.

The invention claimed is:

1. A filter assembly configured to prevent water from infiltrating one or both of a fuel tank or engine, the filter assembly comprising:
   a housing including a fuel inlet line and a fuel outlet line, wherein the housing defines an internal chamber in fluid communication with the fuel inlet line and the fuel outlet line, wherein the housing is configured to allow fuel to pass into the internal chamber through the fuel inlet, and to allow filtered fuel to pass out of the internal chamber to the fuel tank or the engine through the fuel outlet line;
   a filtering frame secured within the internal chamber, wherein the filtering frame includes a coalescing frame portion that is configured to allow water to coalesce thereon and sink toward a bottom of the internal chamber, wherein the coalescing frame portion comprises a first rim defining a first central opening connected to an opposed second rim defining a second central opening through a plurality of spaced-apart extension beams, and a hydrophobic frame portion that is configured to repel the water, wherein the hydrophobic frame portion includes a valve, wherein the valve is coupled to the fuel outlet line, wherein the hydrophobic frame portion further includes a plurality of inwardly-canted beams that inwardly cant and extend from the first rim and connect to the valve, wherein the valve comprises a central hub having a valve passage formed therethrough; and
   a flow restrictor that is configured to float on the water toward the valve, wherein the flow restrictor sealingly engages the valve to prevent fluid from flowing through the valve when a surface level of the water is proximate to the valve.

2. The filter assembly of claim 1, wherein the housing further comprises a base connected to a cap, wherein the base includes a support floor, and wherein the cap includes the fuel inlet line and the fuel outlet line.

3. The filter assembly of claim 1, wherein the plurality of spaced-apart extension beams are regularly spaced about the coalescing frame portion, wherein a radius between each of the plurality of spaced-apart extension beams and a central longitudinal axis of the filtering frame is constant along an entire height of each of the plurality of spaced-apart extension beams, and wherein each of the inwardly-canted beams extends from an internal surface of the first rim proximate to a root of a respective one of the plurality of spaced-apart extension beams.

4. The filter assembly of claim 1, wherein the plurality of inwardly-canted beams are regularly spaced about the hydrophobic frame portion.

5. The filter assembly of claim 1, wherein the hydrophobic frame portion comprises a conic shape.

6. The filter assembly of claim 1, wherein the flow restrictor comprises a ball.

7. The filter assembly of claim 1, wherein a specific gravity of the flow restrictor is greater than a specific gravity of the fuel and less than a specific gravity of water.

8. The filter assembly of claim 1, wherein the valve is integrally formed with the hydrophobic frame of the same material as the hydrophobic frame.

9. An equipment system, comprising:
   a fuel delivery line;
   an engine disposed at an end of the fuel delivery line; and
   a filter assembly disposed within the fuel delivery line upstream from the engine, wherein the filter assembly is configured to prevent water from infiltrating the engine, the filter assembly comprising:
      a housing including a fuel inlet line and a fuel outlet line, wherein the housing defines an internal chamber in fluid communication with the fuel inlet line and the fuel outlet line, wherein the housing is configured to allow fuel to pass into the internal chamber through the fuel inlet, and to allow filtered fuel to pass out of the internal chamber to the engine through the fuel outlet line;
      a filtering frame secured within the internal chamber, wherein the filtering frame includes a coalescing frame portion that is configured to allow water to coalesce thereon and sink toward a bottom of the internal chamber, wherein the coalescing frame portion comprises a first rim defining a first central opening connected to an opposed second rim defining a second central opening through a plurality of spaced-apart extension beams, and a hydrophobic frame portion that is configured to repel the water, wherein the hydrophobic frame portion includes a valve, wherein the valve is coupled to the fuel outlet line, wherein the hydrophobic frame portion further includes a plurality of inwardly-canted beams that inwardly cant and extend from the first rim and connect to the valve, wherein the valve comprises a central hub having a valve passage formed therethrough; and
      a flow restrictor that is configured to float on the water toward the valve, wherein the flow restrictor sealingly engages the valve to prevent fluid from flowing through the valve when a surface level of the water is proximate to the valve.

10. The equipment system of claim 9, wherein the housing further comprises a base connected to a cap, wherein the base includes a support floor, and wherein the cap includes the fuel inlet line and the fuel outlet line.

11. The equipment system of claim 9, wherein the hydrophobic frame portion comprises a conic shape.

12. The equipment system of claim 9, wherein the flow restrictor comprises a ball.

13. The equipment system of claim 12, wherein a specific gravity of the flow restrictor is greater than a specific gravity of the fuel and less than a specific gravity of water.

14. The equipment system of claim 9, wherein the valve is integrally formed with the hydrophobic frame of the same material as the hydrophobic frame.

15. The equipment system of claim 9, wherein the plurality of spaced-apart extension beams are regularly spaced about the coalescing frame portion, wherein a radius between each of the plurality of spaced-apart extension beams and a central longitudinal axis of the filtering frame is constant along an entire height of each of the plurality of spaced-apart extension beams, and wherein each of the inwardly-canted beams extends from an internal surface of the first rim proximate to a root of a respective one of the plurality of spaced-apart extension beams.

16. A filter assembly configured to prevent water from infiltrating one or both of a fuel tank or engine, the filter assembly comprising:
   a housing including a base connected to a cap, wherein the base includes a support floor, and wherein the cap includes a fuel inlet line and a fuel outlet line, wherein the base and the cap define an internal chamber that is in fluid communication with the fuel inlet line and the fuel outlet line, wherein the housing is configured to allow fuel to pass into the internal chamber through the fuel inlet, and to allow filtered fuel to pass out of the internal chamber to the fuel tank or the engine through the fuel outlet line;

a filtering frame secured within the internal chamber, wherein the filtering frame consists of (a) a coalescing frame portion that is configured to allow water to coalesce thereon and sink toward a bottom of the internal chamber, wherein the coalescing frame portion consists of a first rim defining a first central opening connected to an opposed second rim defining a second central opening through a plurality of spaced-apart extension beams, and (b) a hydrophobic frame portion that is configured to repel the water from a valve, wherein the valve is coupled to the fuel outlet line, wherein the hydrophobic frame portion consists of a plurality of inwardly-canted beams that connect to the valve, wherein the valve comprises a central hub having a passage formed therethrough; and a flow restrictor that is configured to float on the water toward the valve, wherein the flow restrictor sealingly engages the valve to prevent fluid from flowing through the valve when a surface level of the water is proximate to the valve, wherein a specific gravity of the flow restrictor is greater than a specific gravity of the fuel and less than a specific gravity of water.

17. The filter assembly of claim 16, wherein the plurality of extension beams are regularly spaced about the coalescing frame portion, wherein a radius between each of the plurality of spaced-apart extension beams and a central longitudinal axis of the filtering frame is constant along an entire height of each of the plurality of spaced-apart extension beams, wherein each of the inwardly-canted beams extends from an internal surface of the first rim proximate to a root of a respective one of the plurality of spaced-apart extension beams, and wherein the plurality of inwardly-canted beams are regularly spaced about the hydrophobic frame portion.

18. The filter assembly of claim 16, wherein the hydrophobic frame portion comprises a conic shape.

19. The filter assembly of claim 16, wherein the flow restrictor comprises a ball.

20. The filter assembly of claim 16, wherein the valve is integrally formed with the hydrophobic frame of the same material as the hydrophobic frame.

* * * * *